United States Patent
O'Gara et al.

(10) Patent No.: US 9,421,937 B2
(45) Date of Patent: *Aug. 23, 2016

(54) PANEL WITH INTEGRAL HIDDEN DOOR COVER AND METHOD OF MANUFACTURE AND MATERIALS THEREOF

(71) Applicant: INTEVA PRODUCTS, LLC, Troy, MI (US)

(72) Inventors: John F. O'Gara, Sterling Heights, MI (US); Srimannarayana Kakarala, Bloomfield Hills, MI (US); Donna Hawes, Farmersville, OH (US)

(73) Assignee: INTEVA PRODUCTS, LLC, Troy, MI (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/516,537

(22) Filed: Oct. 16, 2014

(65) Prior Publication Data

US 2015/0137491 A1    May 21, 2015

Related U.S. Application Data

(63) Continuation of application No. 13/827,702, filed on Mar. 14, 2013, now Pat. No. 8,967,659.

(51) Int. Cl.
*B60R 21/2165* (2011.01)
*B29C 59/16* (2006.01)
*B29C 59/00* (2006.01)
*B60R 21/205* (2011.01)
*B60R 21/2342* (2011.01)

(52) U.S. Cl.
CPC ........... *B60R 21/2165* (2013.01); *B29C 59/007* (2013.01); *B60R 21/205* (2013.01); *B60R 21/2342* (2013.01); *B29C 2791/009* (2013.01)

(58) Field of Classification Search
CPC ............ B60R 21/2165; B60R 21/2342; B60R 21/205; B29C 59/007; B29C 2791/009
USPC ................................................ 280/728.3, 732
See application file for complete search history.

(56) References Cited

U.S. PATENT DOCUMENTS

| | | | | |
|---|---|---|---|---|
| 5,882,572 | A * | 3/1999 | Lutze et al. | 264/400 |
| 6,533,314 | B2 * | 3/2003 | Merrifield et al. | 280/728.3 |
| 6,689,306 | B2 * | 2/2004 | Merrifield et al. | 264/511 |
| 6,692,019 | B2 * | 2/2004 | Sommer | 280/732 |
| 6,716,519 | B2 * | 4/2004 | Ueno et al. | 428/308.4 |
| 6,808,197 | B2 * | 10/2004 | Bauer et al. | 280/728.3 |
| 6,921,105 | B2 * | 7/2005 | Speelman et al. | 280/728.3 |
| 7,093,850 | B2 * | 8/2006 | Merrifield et al. | 280/728.3 |

(Continued)

FOREIGN PATENT DOCUMENTS

| | | |
|---|---|---|
| WO | 2012119038 A2 | 9/2012 |
| WO | 2012174074 A2 | 12/2012 |

*Primary Examiner* — Drew Brown
(74) *Attorney, Agent, or Firm* — Cantor Colburn LLP (57) ABSTRACT

A panel having a deployable cover for an airbag module is provided. The panel having: an outer layer having a show surface and an inner surface opposite the show surface; a tear seam formed in the outer layer, the tear seam defined by a plurality of holes formed in the outer layer extending from the inner surface towards the show surface, wherein a residual wall thickness of the outer layer is located between each of the plurality of holes and the show surface, wherein the outer layer includes at least one filler material, that exhibits an absorbance of a wavenumber of a laser used to form the plurality of holes.

20 Claims, 10 Drawing Sheets

(56) References Cited

U.S. PATENT DOCUMENTS

| | | | |
|---|---|---|---|
| 7,431,328 B2 * | 10/2008 | Wittenbecher et al. | 280/728.3 |
| 7,673,896 B2 * | 3/2010 | Yamada et al. | 280/728.3 |
| 7,690,677 B2 * | 4/2010 | Cowelchuk et al. | 280/728.3 |
| 7,748,733 B2 * | 7/2010 | Griebel et al. | 280/728.3 |
| 7,989,728 B2 * | 8/2011 | Wittenbecher | 219/121.62 |
| 8,119,725 B2 * | 2/2012 | Lustiger et al. | 524/513 |
| 8,207,267 B2 * | 6/2012 | Von Tschammer et al. | 525/98 |
| 8,567,814 B2 * | 10/2013 | Crittenden | 280/728.3 |
| 2002/0190505 A1 * | 12/2002 | Feistel et al. | 280/728.3 |
| 2002/0193489 A1 * | 12/2002 | Jung et al. | 524/423 |
| 2006/0261508 A1 * | 11/2006 | Lustiger et al. | 264/140 |
| 2008/0315566 A1 * | 12/2008 | Andrasik et al. | 280/728.3 |
| 2010/0207365 A1 * | 8/2010 | Ohtani et al. | 280/728.3 |
| 2012/0223512 A1 * | 9/2012 | Barr et al. | 280/728.3 |
| 2012/0315446 A1 * | 12/2012 | Wisniewski et al. | 428/195.1 |
| 2013/0049335 A1 * | 2/2013 | Wisniewski et al. | 280/728.3 |

* cited by examiner

15% Talc 1 in TPO
Thickness = 0.46 mm RWT = 0.14 ± 0.03 mm    52

FIG. 11

8% Talc 2 in TPO
Thickness = 0.38 mm RWT = 0.11 ± 0.01 mm    52

FIG. 12

18   52   5% Mica in TPO
Thickness = 0.37 mm RWT = 0.09 ± 0.02 mm

FIG. 13

18   5% Wollastonite in TPO
Thickness = 0.36 mm RWT = 0.14 ± 0.02 mm    52

FIG. 14

PANEL WITH INTEGRAL HIDDEN DOOR COVER AND METHOD OF MANUFACTURE AND MATERIALS THEREOF

CROSS REFERENCE TO RELATED APPLICATIONS

This application is a continuation of U.S. patent application Ser. No. 13/827,702 filed Mar. 14, 2013, the entire contents of which are incorporated herein by reference thereto.

BACKGROUND

The present invention relates generally to an instrument panel used in a vehicle having an inflatable cushion or airbag module, and more particularly to an instrument panel cover having an integral hidden door and the method of manufacture thereof. The present invention also relates to the materials used for the instrument panels and methods of employing the same.

Vehicles are now equipped with some type of inflatable cushions or airbag modules and other vehicle components have been modified to accommodate the use of such systems. For example, most passenger side airbag modules are disposed within and behind an instrument panel which extends across at least a portion of the width of a vehicle compartment. During assembly and/or manufacture, an instrument panel in a vehicle having a passenger side airbag module requires a discrete door or predetermined area which will open during initiation of the airbag so that the inflatable cushion can deploy through an opening in the instrument panel or dashboard. This door is designed to open in response to the force of the expanding inflatable cushion. In other words as the pressure in the inflatable cushion increases, the volume of the cushion increases and applies a force to a portion of the door wherein the door selectively separates from the remaining portion of the instrument panel to permit the inflatable cushion to deploy therethrough.

In some applications, the instrument panel was formed with an opening adjacent to the location of the airbag module. Then opening was covered by a separate door which is secured to the instrument panel and faces the occupants of the vehicle. However, the outer periphery of such a door is clearly visible to the vehicle occupant and may create an unpleasing appearance to the instrument panel.

Therefore it is desirable to provide a hidden passenger airbag door in lieu of a separate door/airbag system assembly for aesthetic reasons. In order to provide this hidden airbag door (e.g., no tear seams are visible from the exterior show surface of the instrument panel or dashboard) a tear seam must be provided in the materials of the instrument panel wherein the tear seam allows for deployment of the inflatable cushion during an activation event while being invisible to the naked eye.

In one application, a $CO_2$ laser is used to penetrate or score partially through some or all of the components of the instrument panel in order to provide the "tear seam". A score depth consistency is highly dependent on the ability of the skin laser to absorb the laser light in a consistent fashion along the entire length of the tear seam. Score depth consistency at the desired penetration depth is required to achieve a desired "breakthrough force" to ensure proper airbag deployment as well as provide an adequate resistive force to external loads applied to the door from the A-side or show surface of the skin layer during normal vehicle operation. Visual readthrough of the seam on the top side or show surface of the skin layer is undesirable and highly dependent upon the intensity of the power required of the laser to "burn through" the retainer substrate and foam layers in addition to the absorption.

Consistent absorption of laser light in the skin layer of the tri-laminate construction can be difficult, particularly with an olefin based skin (compact sheet). Readthrough of the laser-scored seam can also be an issue and is highly dependent on the materials of construction.

Due to ongoing desires for improving the aesthetics of the passenger compartment, it is desirable to provide aesthetically pleasing, functional alternatives to the conventional instrument panels having a separate door covering the airbag module.

SUMMARY OF THE INVENTION

According to one exemplary embodiment of the present invention, a panel having a deployable cover for an airbag module is provided. The panel having: an outer layer having a show surface and an inner surface opposite the show surface; a tear seam formed in the outer layer, the tear seam defined by a plurality of holes formed in the outer layer extending from the inner surface towards the show surface, wherein a residual wall thickness of the outer layer is located between each of the plurality of holes and the show surface, wherein the outer layer includes at least one filler material, that exhibits an absorbance of a wavenumber of a laser used to form the plurality of holes.

In yet another embodiment, a panel having a deployable cover for an airbag module is provided. The panel having: an outer layer having a show surface and an inner surface opposite the show surface; a tear seam formed in the outer layer, the tear seam defined by a plurality of holes formed in the outer layer extending from the inner surface towards the show surface, wherein a residual wall thickness of the outer layer is located between each of the plurality of holes and the show surface, wherein the outer layer includes at least one filler material, that exhibits an absorbance in an FTIR spectra at 950 $cm^{-1}$.

In still yet another embodiment, a method of forming a tear seam in a panel is provided. The method including the steps of: forming an outer layer of the panel, the outer layer having a show surface and an inner surface opposite the show surface; forming a tear seam with a laser in the outer layer, the tear seam defined by a plurality of holes formed in the outer layer extending from the inner surface towards the show surface, wherein a residual wall thickness of the outer layer is located between each of the plurality of holes and the show surface, wherein the outer layer includes at least one filler material, that exhibits an absorbance of a wavenumber of the laser.

BRIEF DESCRIPTION OF THE DRAWINGS

The present invention will now be described, by way of example only, with reference to the accompanying drawings in which.

The above-described and other features and advantages of the present application will be appreciated and understood by those skilled in the art from the following detailed description, drawings, and appended claims.

DETAILED DESCRIPTION OF EXEMPLARY EMBODIMENTS

Reference is made to the following U.S. patents the contents each of which are incorporated herein by reference thereto U.S. Pat. Nos. 6,533,314; 6,689,306; 6,692,019; 6,921,105; and 7,093,850. Reference is also made to the following U.S. Patent Publication U.S. 2008/0315566, the contents of which is also incorporated herein by reference thereto.

In accordance with exemplary embodiments of the present invention an airbag module cover/instrument panel with a deployable door and invisible tear seam is provided. Still further, various exemplary embodiments of the present invention are directed to materials used in the components of the instrument panel in order to facilitate the forming of the aforementioned invisible tear seam.

Figure 1:
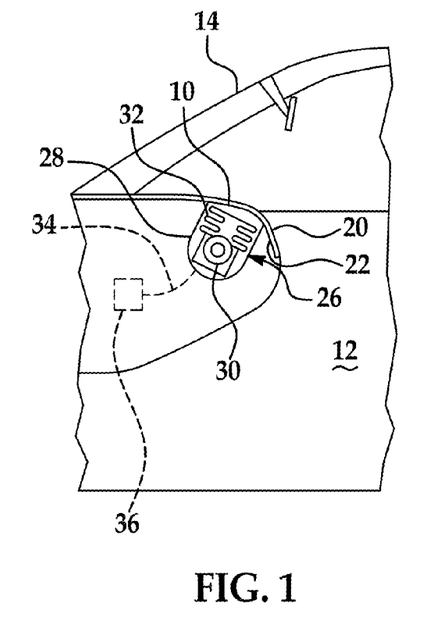
FIG. 1 is a partial cross sectional view of a vehicle interior.
Figure 2:
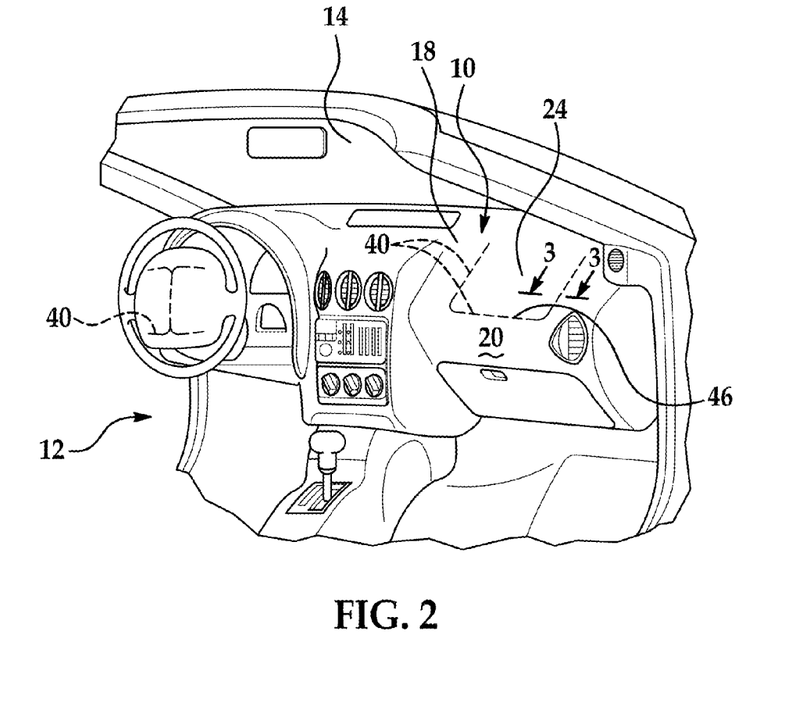
FIG. 2 is a partial perspective view of a vehicle interior.

Referring now to FIGS. 1-2, an instrument panel is generally indicated at 10. The instrument panel 10 is assembled into a vehicle passenger compartment 12 partially shown in FIG. 2. The instrument panel is generally disposed beneath a windshield 14 and extends across substantially the entire width of the passenger compartment 12. Of course, exemplary embodiments contemplate the instrument panel covering only a portion of the vehicle interior.

In accordance with various exemplary embodiments of the present invention and as will be described in greater detail hereinafter, the instrument panel 10 comprises a covering layer or outer layer 18; an intermediary layer 43; and a substrate layer 45 wherein the instrument panel has an outer show surface 20 and an inner surface 22. The instrument panel further comprises a deployment door 24 formed therein. The deployment door is intended to be in the general area corresponding to a passenger side airbag module 26. Accordingly, the passenger side airbag module is located and deployed therethrough during actuation of the passenger side airbag module under predetermined deployment conditions.

Airbag module 26 further comprises a housing 28, an inflator 30 and an inflatable cushion 32 wherein the inflator inflates the inflatable cushion in response to a signal 34 received from a sensing or control module 36 configured to determine if an activation event is occurring. As is known in the related arts, the control module receives signals from a plurality of sensors disposed throughout the vehicle.

In accordance with various embodiments of the present invention, the instrument panel is formed from a plurality of layers each comprising any one of a number of suitable materials or combinations thereof. In one embodiment, the instrument panel is formed from thermoplastic and thermoset materials.

For example, suitable thermoplastic materials include but are not limited to polyethylene based polyolefin elastomer or polypropylene based thermoplastic elastomer, poly-urethane resins and other copolymers and equivalents thereof. Non-limiting examples include; thermoplastic elastic olefin (TEO), thermoplastic elastomer (TPE), thermoplastic elastomer-oefinic (TPE-O, TPO), thermoplastic elastomer-styrenic (TPE-S), Polycarbonate (PC), Polycarbonate/Acrylonitrile-Butadiene-Styrene (PC/ABS), Acrylonitrile-Butadiene-Styrene (ABS) copolymers, Poly-urethane (TPU) and Polyvinyl-Chloride (PVC).

Non-limiting examples of thermosets include but are not limited to polyamide, polybutadiene, polyether block amide (PEBA), polyetherimide, polyimide, polyurea, polyurethane (PUR), silicone, vinyl ester, phenolic, melamine, urea formaldehyde resins, Fluoropolymers such as polytetrafluoroethylene (PTFE) and polyvinylidene fluoride (PVDF).

Preferred materials are those materials that have the desired characteristics of strength, durability, flexibility, and finished appearance and feel for use as an instrument panel 10 or a cover for a driver's side airbag module. As illustrated, the instrument panel comprises a plurality of layers such as an outer surface, an inner foam layer and a lower substrate layer.

It is, of course, understood that the passenger side airbag module and the configuration of the instrument panel illustrated in FIGS. 1 and 2 are provided as examples and various other configurations of the instrument panel and the airbag module are contemplated thus, the present invention is not intended to be limited to the specific configurations illustrated in FIGS. 1 and 2.

Figure 3:
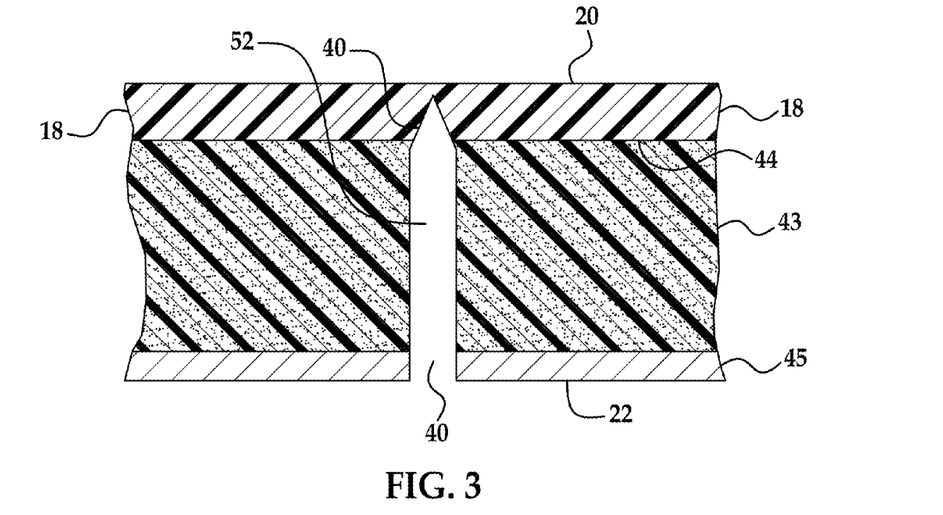
FIG. 3 is a view along lines 3-3 of FIG. 2.

The instrument panel has an interior show surface 20 that is intended to include the surface of the instrument panel that is exposed to the vehicle interior and its occupants. Thus, a sheet of material having a show surface or an outer aesthetically pleasing appearance is provided. In accordance with an exemplary embodiment, the same sheet or instrument panel also provides a portion of a cover for an airbag module. Referring now to FIGS. 1-3, the instrument panel and/or cover of the airbag module is formed with a tear seam 40.

In accordance with various exemplary embodiments of the present invention, tear seam 40 comprises a plurality of cuts, scores or openings 52 having various depths or similar depths arranged in a pattern to define the tear seam 40. See for example at least FIGS. 4A-4C. In one embodiment, each cut, score or opening 52 is a hole a recess formed by a laser that extends towards the outer show surface 24 but does not extend completely through layer 18. The cut, score or openings 52 are arranged in a pattern in order to facilitate or define tear seam 40. Tear seam 40 is configured in known shapes or patterns, such as a "U", "H", "I" or "X" to provide deployable doors. It is, of course, understood that the affirmation patterns are merely non-limiting examples and any suitable tear seam 40 is considered to be within the scope of exemplary embodiments of the present invention.

Although a vehicle passenger side airbag is illustrated it is, of course, understood that a deployable airbag door with an invisible tear seam can be formed over any type of vehicle airbag (e.g., driver side, seat, door module, side curtain airbag, knee bolster, etc.) in accordance with various embodiments of the present invention.

As illustrated, the instrument panel/cover has an outer layer 18 having show surface 20 and an inner surface 44. The instrument panel/cover, in one embodiment, also has an intermediary foam layer 43 and a substrate layer 45. The combination of the outer layer 18, foam layer 43 and substrate layer 45 when separated from the remaining portions of the instrument panel along the tear seam 40 define a deployment door opening 46 in the cover/instrument panel. Of course, the deployment door may simply comprise outer layer 18 and a foam layer 43. Alternatively, the door may simply comprise outer layer 18 and any other combination of backing layers.

FIG. 3 shows that the tear seam extends into the cover/instrument panel from the substrate layer 45, into the foam layer 43 and partially into the inner surface 44 of the outer layer 18 however the tear seam does not extend all the way through to the outer layer 18. Thus, and when the cover is installed in the vehicle the tear seam is not visible through the show surface. Alternatively, the tear seam 40 (e.g., holes 52) may only be formed in outer layer 18. In yet another embodiment, the holes 52 or tear seam 40 is formed in outer layer 18 and foam layer 43.

As mentioned above and in one embodiment, the tear seam 40 or the plurality of holes 52 are formed by a laser scoring process. For example and as illustrated schematically in FIG. 4, a laser unit 50 scores, cuts the instrument panel 10 to provide a plurality of cuts or openings 52 that extends all the way into the outer layer 18 however, the opening 52 does not extend all the way through outer layer 18 thereby leaving a residual wall thickness of layer 18 (e.g., the portion of layer 18 remaining between the show surface 20 and opening 52. In order to achieve this, a sensor 54 is located proximate to the outer show surface 20 of outer layer 18. Sensor 54 picks up transmitted radiation through the exterior show surface 20 and provides feedback to a controller 56 of a laser scoring apparatus or system 58. In other words, the residual material thickness or residual wall thickness of outer layer 18 is maintained or provided through operation of the laser scoring apparatus or system 58 using a sensor or sensors 54 that are configured to provide feedback to the system 58. For example, if the score or penetration 52 into outer layer 18 becomes too deep sensor 54 will pick up the radiation from the laser and thus provide feedback to the laser to cause it to stop.

Figure 4:
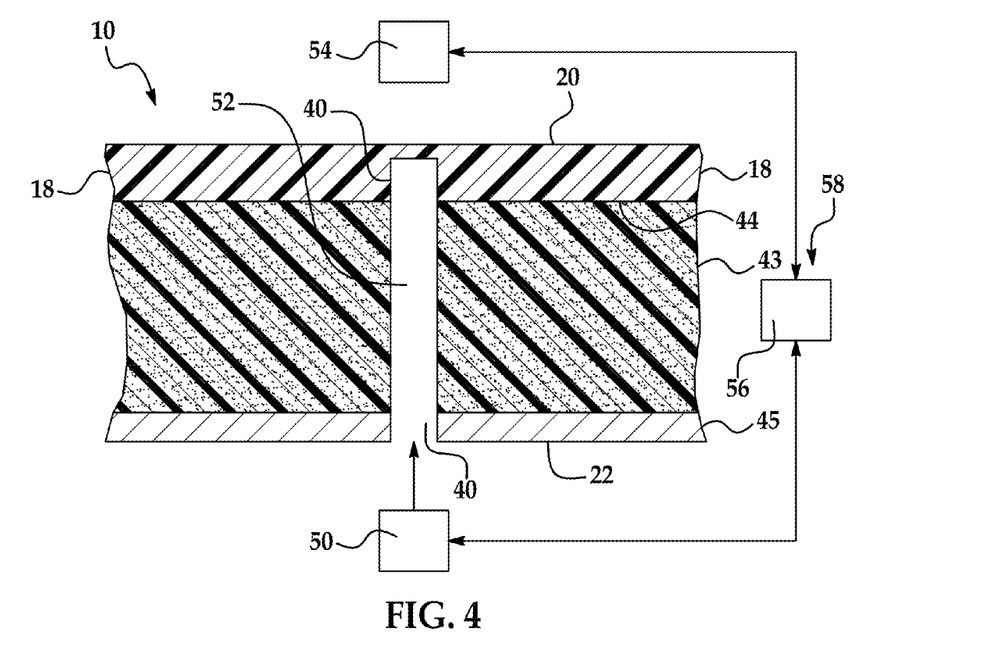
FIG. 4 is schematic illustration a laser scoring process.
Figure 4A:
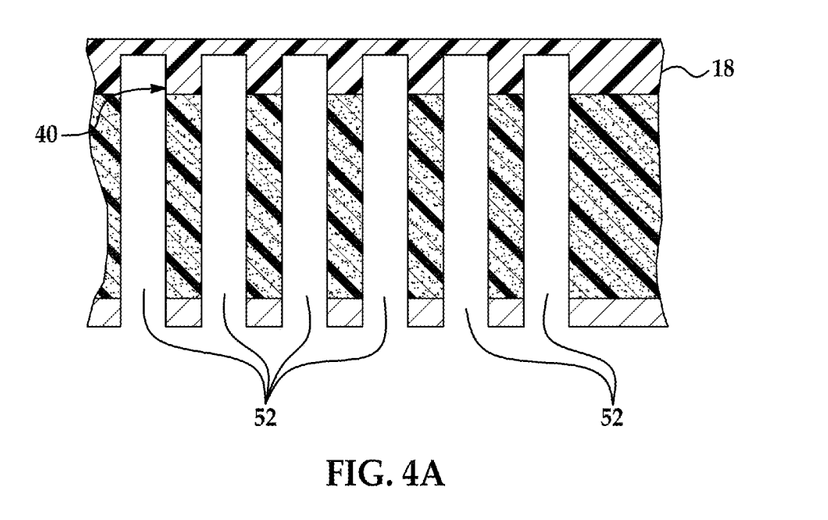
FIGS. 4A-4C are cross-sectional views illustrating various tear seams.
Figure 4B:
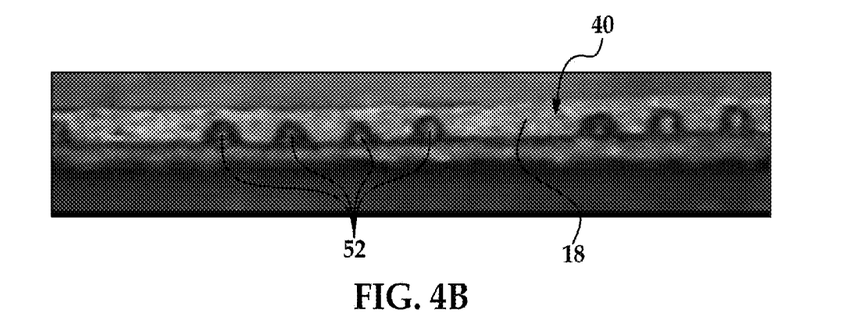
Figure 4C:
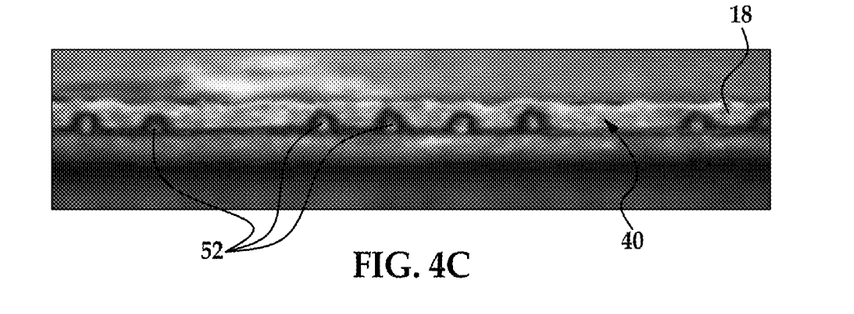

Accordingly, operation of system 58 and the accuracy of providing a desired residual material thickness in outer layer 18 is dependent upon the accuracy of the system 58. For example, if the material used for outer layer 18 is transparent to the radiation emitted by laser unit 50, sensor 54 may inadvertently give a false reading concerning the thickness of outer layer 18.

In one exemplary embodiment, a $CO_2$ laser was used to score hidden airbag door seams for instrument panels. One such device is commercially available from Jenoptik (see also U.S. Pat. Nos. 5,882,572; 6,808,197; 7,431,328; and 7,989,728; the contents each of which are incorporated herein by reference thereto).

In accordance with one exemplary embodiment and during testing an initial skin formulation of outer layer 18 was not burning optimally when exposed to the laser and at least two defects were noted: 1) the skin material appeared to be transparent to the laser and thus, the sensor 54 provides a signal that causes the laser to turn off and/or advance to the next location prior to achieving the desired depth of opening 52; and 2) there was a lot of variability in reaction to the laser (skips or blow through, e.g., no cut or opening 52 was made or the cut or opening 52 went completely through outer layer 18).

Accordingly, new material formulations were developed to enable laser scoring in the compact sheet (outer layer 18) and/or bilaminate sheet (outer layer 18 and intermediary layer 43) that are used in the thermoplastic skin material covering the airbag regions of a vehicle.

The benefits obtained using these new formulations include: 1) Improved quality and performance; 2) Ability to score skins at thermoformed thicknesses as low as 0.2 mm; 3) Homogeneous material properties with good filler dispersion; 4) Consistent scoring depth and Residual Wall thickness (RWT) with a low standard deviation; 5) Reduced or eliminated skips in the scoring pattern; 6) No visible read through of the score line after aging; 7) Good tear strength for successful air bag deployment with no fragmentation or ballooning of skin; 8) Reduced manufacturing cycles times (cutting speed of the laser scan can be increased).

As mentioned above, the laser scorability of thermoplastic skins are dependent on the transmissivity of the material to the wavelength of the laser light. The laser wavelength used with a Jenoptik laser for laser scoring is $1.0526 \times 10^{-5}$ m (which corresponds to a wave number of 950 $cm^{-1}$).

Most thermoplastic formulations show minimal absorbance at this wave length as revealed in a Fourier Transform Infrared Spectroscopy (FTIR) trace of a representative outer layer material, unless specific additives are used. The inventors have found that the use of additives or modifiers that exhibit an absorbance at 950 $cm^{-1}$ wavenumber as observed in a FTIR spectrum of the material can enhance the laser scorability of the material.

In one exemplary embodiment, the use of talc as an additive proved effective. In addition, the inventors have found that different talcs with different chemical compositions can perform better in the laser scorability depending on the relative absorbance at this wavelength.

The improved performance is measured by the consistent scoring depth at thicknesses as low as 0.2 mm, Residual Wall Thickness with low standard deviation (RWT of 0.10 to 0.20 mm, standard deviation of 0.01 mm), and increased cutting speed (30 mm/s versus 20 mm/s).

Also, other minerals including wollastonite, nanoclays (one non-limiting example is a nanoclay available from Southern Clay Products, Cloisite SCPX 2970), and mica have also been successful in improving the laser scorability. Still further it is contemplated that any additive which has an absorbance at 950 $cm^{-1}$, will improve the laser scorability of a material if included in the formulation.

In order to achieve the desired effect, it is desirable to have the additive dispersed uniformly throughout the resultant skin material. One method for achieving this is to change or modify the geometry of the screws of the extruder based upon the type of additive being used (e.g., certain screw geometries are more advantageous than others depending on the type of additive). The dispersion of the additive can be improved through the use of surface treatments or coupling agents, which will assist in the disbursement of the additive(s). Also, the needed concentration of the additive will depend on the strength of the absorbance at this wavelength and the overall thickness of the skin. For applications where the formed skinned is reduced to a thicknesses of approximately 0.2 mm, higher concentrations of additives may be required depending on the absorbance of the additive.

Figure 5:
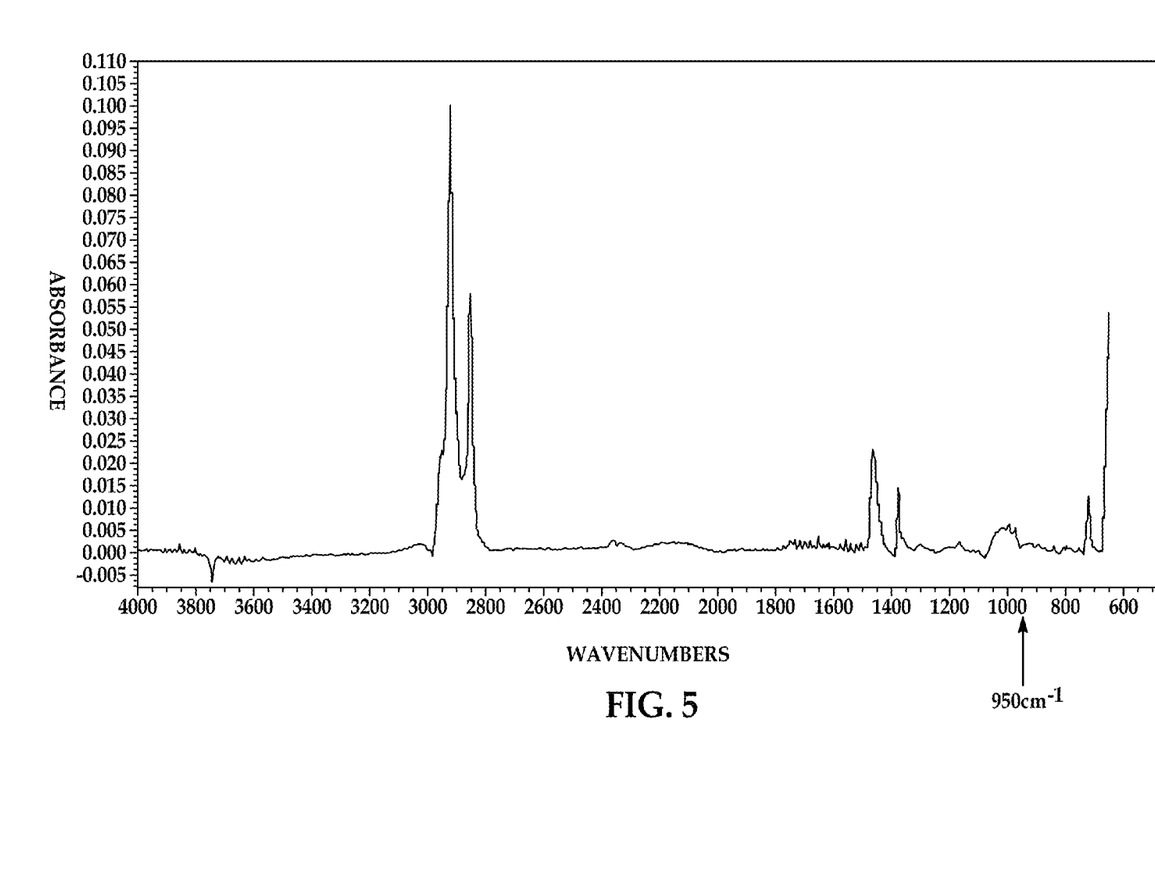
FIG. 5 is a FTIR spectrum of a polyolefin skin material with no specific additives for increasing the laser scorability.

FIG. 5 illustrates the Fourier transform infrared spectroscopy (FTIR) spectrum of a representative thermoplastic polyolefin skin material with no specific additives for increasing laser scorability. As illustrated, very little absorbance is observed in the 950 cm$^{-1}$ region and thus, the material does not laser score reliably.

Figure 6:
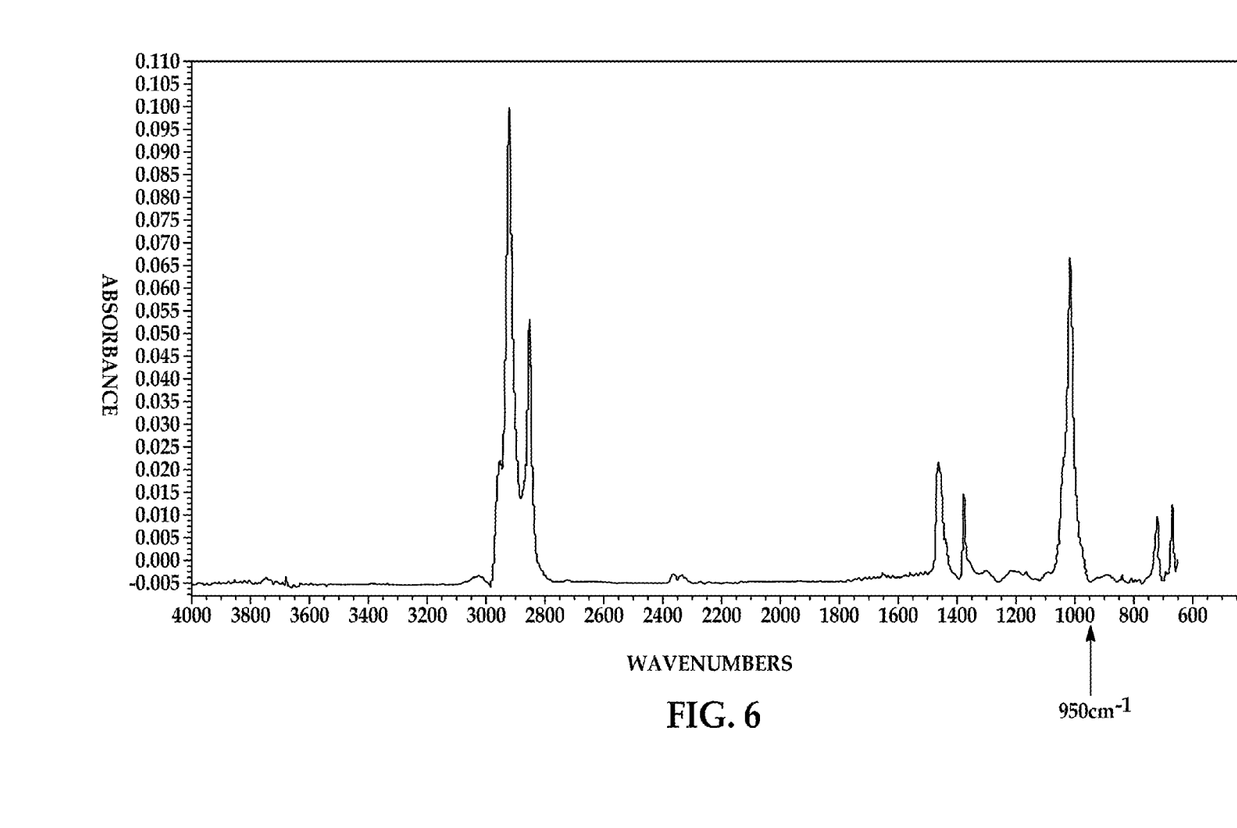
FIG. 6 is a FTIR spectrum for a polyolefin skin material with 8 weight % of Talc 1 for improving the laser scorability

Referring now to FIG. 6, a Fourier transform infrared spectroscopy (FTIR) spectrum of a thermoplastic polyolefin skin material with the addition of talc to the formulation at a level of 8 weight % showed an increase in absorbance in the 950 cm$^{-1}$ region. A bilaminate material (TPO skin backed with foam) will reliably score down to a skin thickness of approximately 0.5 mm with the addition of this 8 weight % talc.

Figure 7:
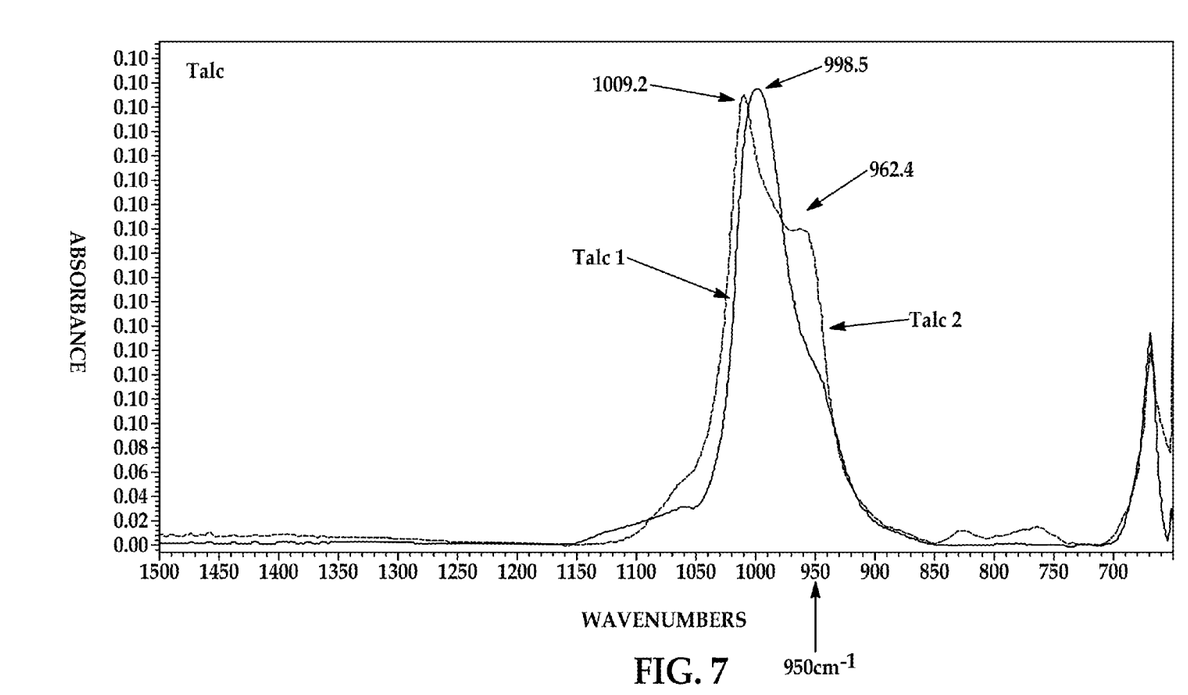
FIG. 7 is a FTIR spectra of two representative talc samples around the 950 cm$^{-1}$ region, Talc 1 and Talc 2.

In FIG. 7, the FTIR absorbance for two different commercially available talcs (Talc 1—Imerys JetFil 700C and Talc 2—IMI FABI Ch05L) is illustrated. The FTIR of FIG. 7 reveals that, depending on the chemical composition, the amount of absorbance will vary in the 950 cm$^{-1}$ region namely, Talc 1 versus Talc 2. As illustrated, Talc 2 shows a significant increase in absorbance over Talc 1 in this region. Formulations with Talc 2 can be laser scored down to a skin thickness of 0.3 mm as compared to the approximate thickness of 0.5 mm for Talc 1 at the same concentration of 8 weight %. Allowing for an occasional skip, formulations with Talc 2 at 8 weight % can be scored to approximately 0.2 mm.

Figure 11:
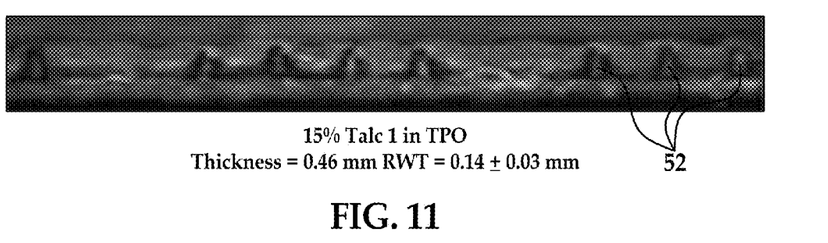
FIG. 11 is a microscopy image along a tear seam formed with a TPO skin in accordance with another exemplary embodiment.

As shown in the microscopy image of FIG. 11, increasing the concentration of Talc 1 to 15 weight % can lower the range of thicknesses that can be scored.

Figure 8:
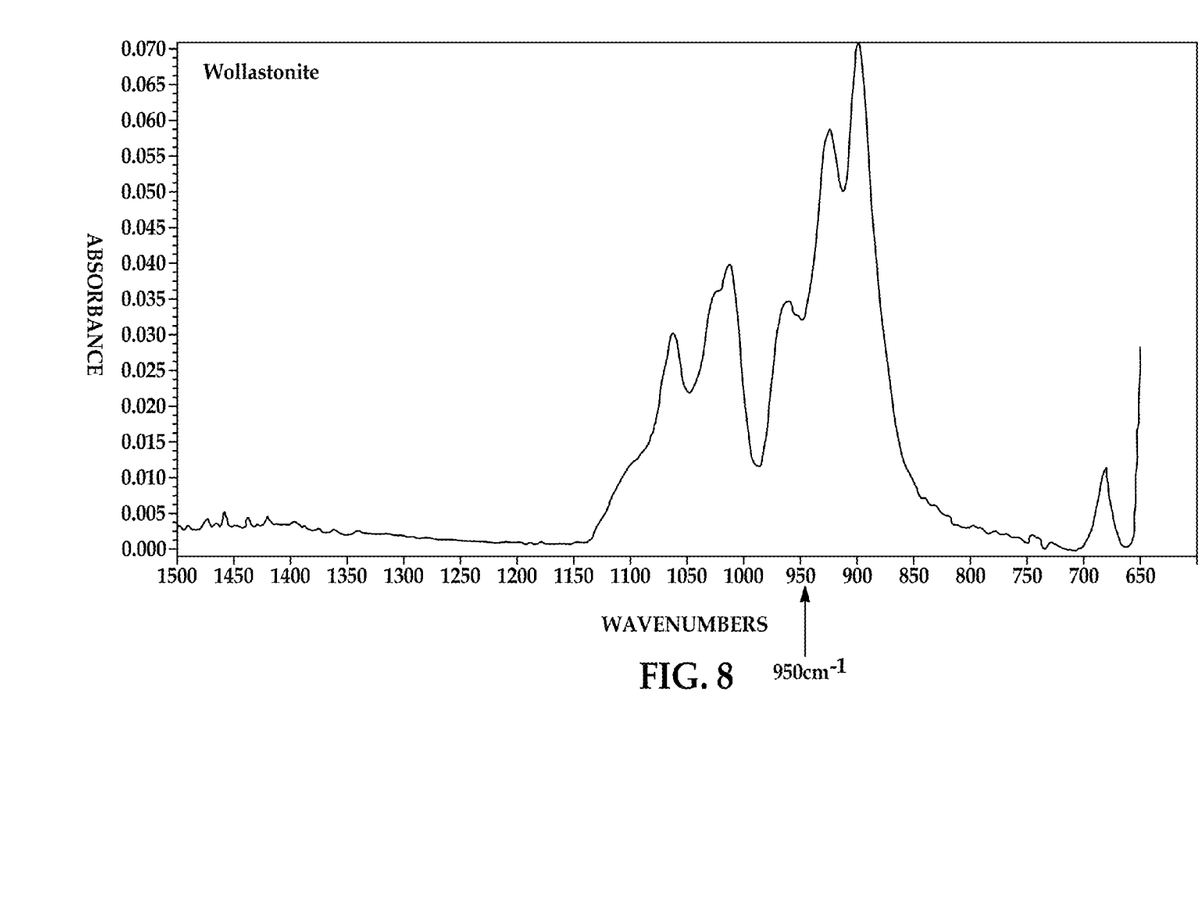
FIG. 8 is a FTIR spectrum of a representative wollastonite sample around the 950 cm$^{-1}$ region.
Figure 9:
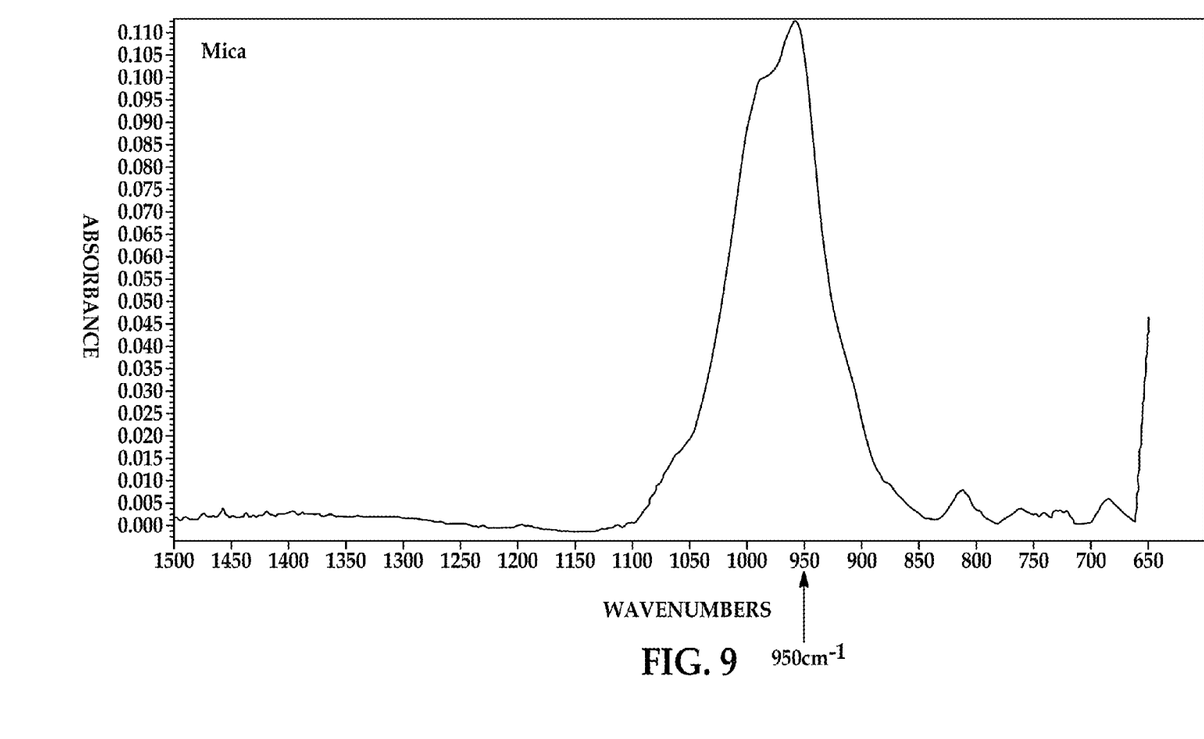
FIG. 9 is a FTIR spectrum of a representative mica sample around the 950 cm$^{-1}$ region.

FIGS. 8 and 9 show significant FTIR absorbance for mica (Suzorite Mica Products, Inc.) and wollastonite (Intercorp, Inc Fillex 6-AF1) in the 950 cm$^{-1}$ region. Thus the outer layer materials with mica and wollastonite can be reliably scored down to 0.3 mm at the concentration of 5% as shown in FIGS. 8 and 9. Results for these materials were also successful at concentrations of 3.5% down to skin thicknesses of 0.3 mm.

These material formulations can be applied to a compact sheet or bilaminate or multilaminate sheet. Sheet constructions can include the following: Polymer skin only (outer layer 18), Polymer skin and foam sheet (outer layer 18 and intermediary foam layer 43), Polymer skin and a scrim layer ((e.g., woven fabric or textile), Polymer skin foam scrim, and any other constructions with Polymer in the top layer. The extruded sheet can be used for both thermoformed as well as cut and sew applications.

Figure 10:
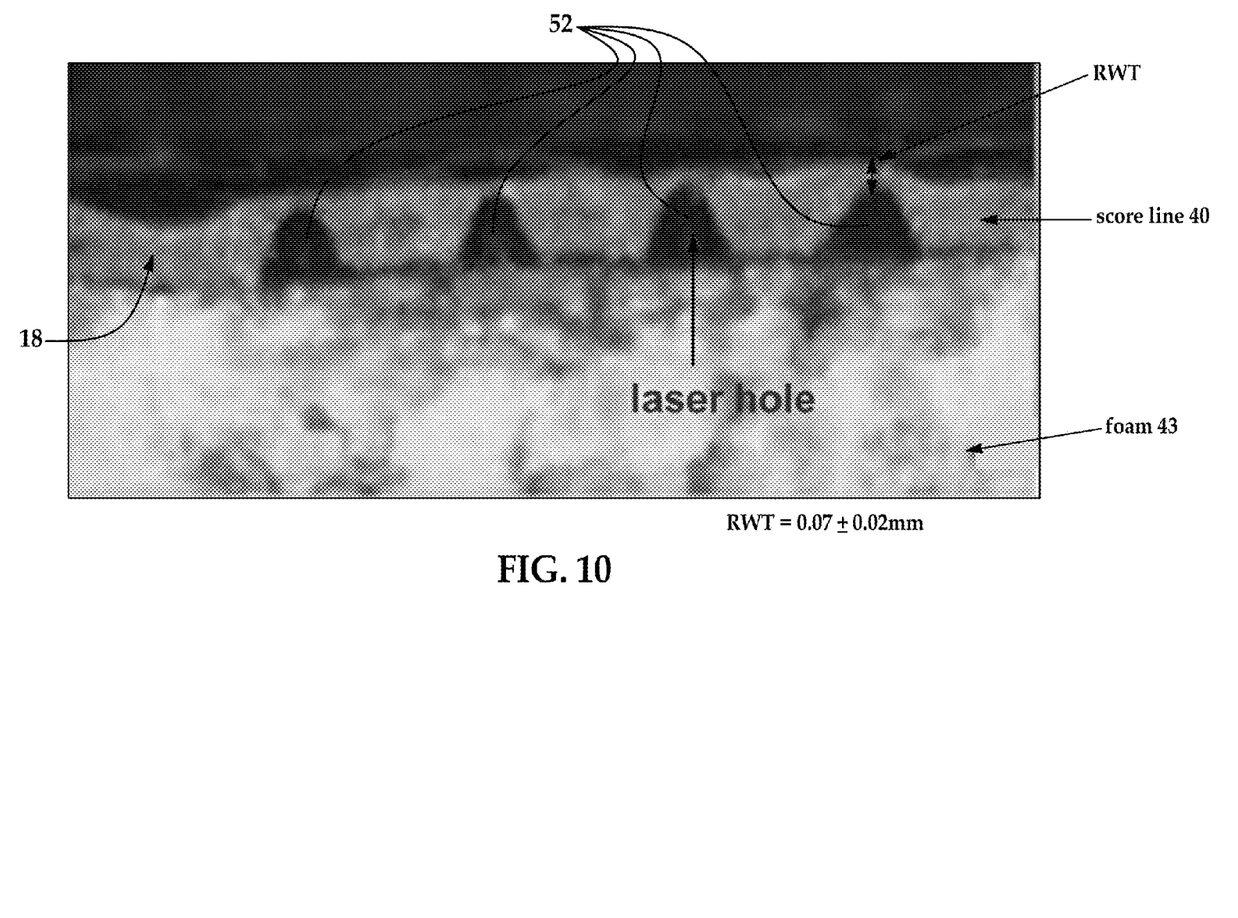
FIG. 10 is a microscopy image along a tear seam formed with a TPO skin in accordance with one exemplary embodiment.

The Polymer skin layer with the laser scored tear seam is used in a panel which includes a substrate having an outer surface. The outer surface of the substrate is covered by the skin layer with the tear seam. The laser scoring will penetrate the rigid substrate, then through any sheet construction as listed above. The laser stops prior to penetrating the overall outer surface as shown in FIG. 10, which yields the needed tear seam for airbag deployment. FIG. 10 is a cross-sectional view along the tear seam. In an alternative process, the laser can be configured to score only outer layer 18 or alternatively any combination of the outer layer 18 and the additional layers mentioned herein (e.g., foam, substrate, scrim and combinations thereof).

Additives or modifiers such as minerals, polymers, chemicals, nanoclays, colorants, etc. with an IR absorbance at 950 cm$^{-1}$ will affect scoring if present in the formulation.

The outer Polymer skin layer is comprised of a resin matrix with at least one filler material, that exhibits an absorbance in an FTIR spectra at 950 cm$^{-1}$, dispersed throughout the thickness of the skin. The material may also include additives or modifiers that do not have significant absorbance at 950 cm$^{-1}$.

For other lasers of different wavelengths, additives or modifiers can be selected to match the needed absorbance from the FTIR spectra.

In one embodiment, the needed concentration of additive or additives can range from 0.5 to 15 weight % of course, the concentration of the additives may be greater or less than the aforementioned values.

Skin thicknesses can be reliably scored down to 0.2 mm thicknesses if the concentration and relative absorbance at 950 cm$^{-1}$ of the chosen additives are taken into account. Other non-limiting ranges of the overall thickness of the outer layer 18 is 0.1-2.0 mm; 0.5-1.5 mm; 1.0-1.2 mm; 0.5-0.7 mm; 0.3-0.4 mm; 0.36 mm. In addition, other non-limiting ranges of the RWT are: 0.1-0.17 mm; 0.1-0.15 mm; 0.1-0.2 mm. Of course, exemplary embodiments of the present invention contemplate values or ranges greater or less than the aforementioned values or ranges.

FIG. 10 is an example of a through thickness microscopy image along the tear seam which is representative of a TPO skin/foam bilaminate on a plastic substrate. In FIG. 10 the RWT is 0.07±0.02 mm.

Figure 12:
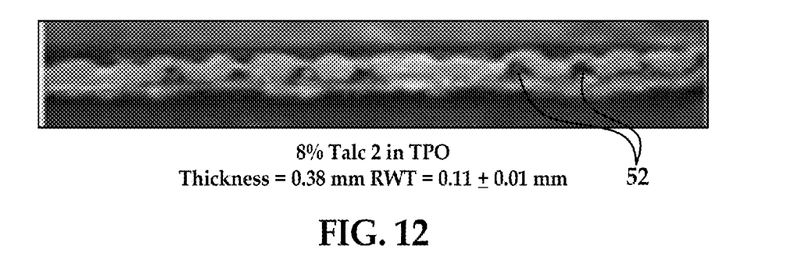
FIG. 12 is a microscopy image along a tear seam formed with a TPO skin in accordance with yet another exemplary embodiment.

FIGS. 11 and 12 are through thickness microscopy images along the tear seam for talc formulations. In FIG. 11 the overall thickness of the outer layer 18 is 0.46 mm and the RWT is 0.14±0.03 mm and the weight percent of Talc 1 in the TPO is 15%. In FIG. 12 the overall thickness of the outer layer 18 is 0.38 mm and the RWT is 0.11±0.01 mm and the weight percent of Talc 2 in the TPO is 8%.

Figure 13:
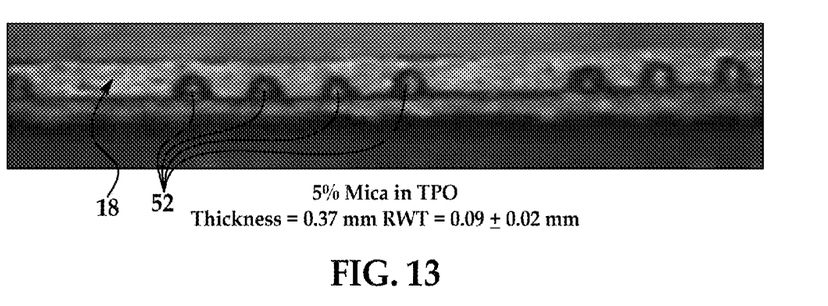
FIG. 13 is a microscopy image along a tear seam formed with a TPO skin in accordance with still another exemplary embodiment.
Figure 14:
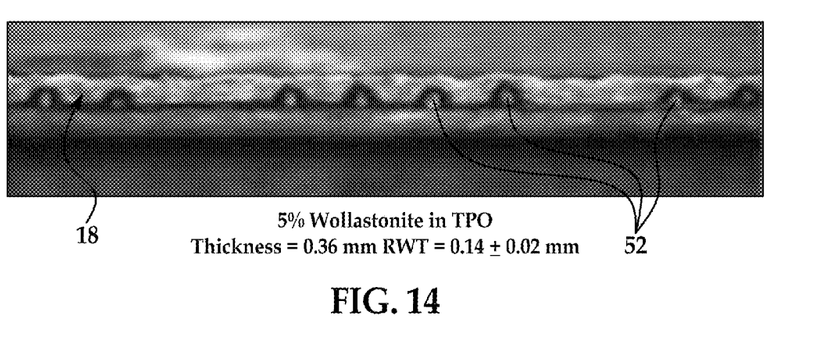
FIG. 14 is a microscopy image along a tear seam formed with a TPO skin in accordance with still another exemplary embodiment.

FIGS. 13 and 14 are through thickness microscopy images along the tear seam for a Mica formulation (FIG. 13) and Wollastonite formulation (FIG. 14). In FIG. 13 the overall thickness of the outer layer 18 is 0.37 mm and the RWT is 0.09±0.02 mm and the weight percent of Mica in the TPO is 5%. In FIG. 14 the overall thickness of the outer layer 18 is 0.36 mm and the RWT is 0.14±0.02 mm and the weight percent of Wollastonite in the TPO is 5%.

Other non-limiting examples of contemplated possible fillers or reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, TiO2, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymeric matrix resin.

Reference is also made to U.S. Patent Publication No. 2012/0315446, the entire contents of which are incorporated herein by reference thereto. Reference is also made to International Publication No. WO 2012/174074, the entire contents of which are incorporated herein by reference thereto.

Reference is also made to U.S. Patent Publication No. 2012/0223512, the entire contents of which are incorporated herein by reference thereto. Reference is also made to International Publication No. WO 2012/119038, the entire contents of which are incorporated herein by reference thereto.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A panel having a deployable cover for an airbag module, the panel comprising:
   an outer layer having a show surface and an inner surface opposite the show surface;
   a tear seam formed in the outer layer, the tear seam defined by a plurality of holes formed in the outer layer extending from the inner surface towards the show surface, wherein a residual wall thickness of the outer layer is located between each of the plurality of holes and the show surface, wherein the outer layer includes at least one filler material, that exhibits an absorbance in an FTIR spectra at 950 cm$^{-1}$, wherein the outer layer is a TPO and the filler material of the TPO is in the range of 0.5 to 8% by weight.

2. The panel as in claim 1, wherein the panel is an instrument panel.

3. The panel as in claim 1, further comprising a substrate layer and an intermediary foam layer located between the outer layer and the substrate layer.

4. The panel as in claim 3, wherein the tear seam extends through the substrate layer and the intermediary foam layer.

5. The panel as in claim 4, wherein the filler material is a Talc.

6. The panel as in claim 1, wherein the filler material is wollastonite.

7. The panel as in claim 1, wherein the filler material is a Talc.

8. The panel as in claim 1, wherein the filler material is a mica.

9. The panel as in claim 1, wherein the plurality of holes are formed by a laser.

10. The panel as in claim 7, wherein the panel is an instrument panel.

11. The panel as in claim 10, further comprising a substrate layer and an intermediary foam layer located between the outer layer and the substrate layer.

12. The panel as in claim 11, wherein the tear seam extends through the substrate layer and the intermediary foam layer.

13. The panel as in claim 1, wherein the filler material is selected from the group comprising: Talc; wollastonite; mica and nanoclays and wherein the plurality of holes are formed by a laser.

14. A method for forming a tear seam in a panel, comprising:
   forming an outer layer of the panel, the outer layer having a show surface and an inner surface opposite the show surface;
   forming a tear seam with a laser in the outer layer, the tear seam defined by a plurality of holes formed in the outer layer extending from the inner surface towards the show surface, wherein a residual wall thickness of the outer layer is located between each of the plurality of holes and the show surface, wherein the outer layer includes at least one filler material, that exhibits an absorbance of a wavenumber of the laser, wherein the outer layer is a TPO and the filler material is in the range of 0.5 to 8% by weight.

15. The method as in claim 14, wherein the wavenumber is a FTIR spectra at 950 cm$^{-1}$.

16. The method as in claim 14, wherein the filler material is selected from the group comprising: Talc; wollastonite; and mica.

17. The method as in claim 14, wherein the panel is an instrument panel and wherein the filler material is a Talc.

18. The method as in claim 17, wherein the panel further comprises a substrate layer and an intermediary foam layer located between the outer layer and the substrate layer and wherein the tear seam extends through the substrate layer and the intermediary foam layer.

19. A panel having a deployable cover for an airbag module, the panel comprising:
   an outer layer having a show surface and an inner surface opposite the show surface;
   a tear seam formed in the outer layer, the tear seam defined by a plurality of holes formed in the outer layer extending from the inner surface towards the show surface, wherein a residual wall thickness of the outer layer is located between each of the plurality of holes and the show surface, wherein the outer layer includes at least one filler material, that exhibits an absorbance of a wavenumber of a laser used to form the plurality of holes, wherein the outer layer is a TPO and the filler material is in the range of 0.5 to 8% by weight.

20. The panel as in claim 19, wherein the panel is an instrument panel.

* * * * *